US006539077B1

(12) United States Patent
Ranalli et al.

(10) Patent No.: US 6,539,077 B1
(45) Date of Patent: Mar. 25, 2003

(54) METHOD AND APPARATUS FOR CORRELATING A UNIQUE IDENTIFIER, SUCH AS A PSTN TELEPHONE NUMBER, TO AN INTERNET ADDRESS TO ENABLE COMMUNICATIONS OVER THE INTERNET

(75) Inventors: Douglas J. Ranalli, Cambridge, MA (US); Thomas P. Sosnowski, Wayland, MA (US); David P. Peek, Atkinson, NH (US)

(73) Assignee: NetNumber.com, Inc., Lowell, MA (US)

(*) Notice: Subject to any disclaimer, the term of this patent is extended or adjusted under 35 U.S.C. 154(b) by 0 days.

(21) Appl. No.: 09/456,646

(22) Filed: Dec. 8, 1999

Related U.S. Application Data

(63) Continuation-in-part of application No. 09/226,901, filed on Jan. 8, 1999, and a continuation-in-part of application No. 09/092,764, filed on Jun. 5, 1998.

(51) Int. Cl.[7] .......................... H04M 1/64; H04M 3/42; H04M 3/00
(52) U.S. Cl. ................ 379/67.1; 379/88.13; 379/88.17; 379/88.18; 379/201.01; 379/218.01; 379/265.09; 379/900; 379/908
(58) Field of Search .............................. 379/67.1, 88.07, 379/88.13, 88.17, 88.18, 201.01, 207.12, 218.01, 265.09, 900, 901, 904, 908

(56) References Cited

U.S. PATENT DOCUMENTS

| 4,850,007 | A | * | 7/1989 | Marino et al. .................. 379/67 |
| 4,924,496 | A | | 5/1990 | Figa et al. .............. 379/142.06 |
| 5,046,088 | A | | 9/1991 | Margulies ............... 379/211.02 |
| 5,315,705 | A | | 5/1994 | Iwami et al. ................. 395/200 |
| 5,483,586 | A | * | 1/1996 | Sussman ...................... 379/201 |
| 5,583,919 | A | | 12/1996 | Talvard et al. ................. 379/67 |
| 5,594,784 | A | | 1/1997 | Velius .......................... 379/88 |
| 5,608,784 | A | | 3/1997 | Miller .......................... 379/88 |
| 5,608,786 | A | | 3/1997 | Gordon ....................... 379/100 |
| 5,646,839 | A | | 7/1997 | Katz ....................... 379/93.01 |
| 5,661,784 | A | | 8/1997 | Zinke .......................... 379/89 |
| 5,684,862 | A | | 11/1997 | Finnigan ................. 379/88.22 |
| 5,687,220 | A | | 11/1997 | Finnigan ................. 379/88.22 |
| 5,692,038 | A | | 11/1997 | Kraus et al. ........... 379/207.13 |
| 5,799,061 | A | | 8/1998 | Melcher et al. ................ 379/45 |
| 5,825,854 | A | | 10/1998 | Larson et al. ................. 379/67 |
| 5,850,433 | A | * | 12/1998 | Rondeau ..................... 379/201 |
| 5,896,444 | A | * | 4/1999 | Perlman et al. .......... 379/93.35 |
| 6,069,890 | A | * | 5/2000 | White et al. ................. 370/352 |
| 6,088,717 | A | * | 7/2000 | Reed et al. .................. 709/201 |
| 6,104,711 | A | | 8/2000 | Voit ........................... 370/352 |
| 6,108,704 | A | * | 8/2000 | Hutton et al. ............... 709/227 |
| 6,125,113 | A | * | 9/2000 | Farris et al. ................. 370/389 |
| 6,215,858 | B1 | * | 4/2001 | Bartholomew et al. .. 379/88.17 |
| 6,222,520 | B1 | * | 4/2001 | Gerszberg et al. .......... 345/113 |
| 6,282,574 | B1 | | 8/2001 | Voit ........................... 709/230 |

FOREIGN PATENT DOCUMENTS

EP 0 823 809 A2 2/1998

OTHER PUBLICATIONS

Electronic Messaging Association, "Welcome to the Electronic Messaging Association", What's New? (Home Page) wvsiwyg://70/http://www.ema.org/ printed Oct. 8, 1998.

(List continued on next page.)

Primary Examiner—Allan Hoosain
(74) Attorney, Agent, or Firm—Finnegan, Henderson, Farabow, Garrett & Dunner

(57) ABSTRACT

A directory service, containing unique identifiers (e.g., telephone numbers) and related Internet address(es), accessible through the Internet. An Internet-enabled communication system, such as IP-PBX or voice mail system, accepts a telephone number as a destination address. It then contacts the directory service and requests the Internet address related to that telephone number. The communication system uses the Internet address to set up a delivery path via the Internet to the destination. Thus, all time-dependent charges normally associated with message delivery by the telephone network can be avoided.

33 Claims, 9 Drawing Sheets

OTHER PUBLICATIONS

VPIM White Paper, "Unified Messaging: The VPIM Initiative"; Bernard M. Elliot, consultant, Vanguard Communication Corporation; http://www.ema.org/vpimdir/present/vpimwp.html; Adapted for republication with permission of publisher, Business Communications Review, from vol. 27, No. 5, (May 1997), pp. 43–47; printed Oct. 8, 1998.

VPIM Frequently Asked Questions, "The Voice Profile for Internet Mail (VPIM) Work Group", last updated Oct. 7, 1998; http://www.ema.org/vpimdir/present/fag.html; printed Oct. 8, 1998.

"The Voice Profile for Internet Mail (VPIM) Work Group"; last updated Oct. 7, 1998, http://www.ema.org/vpimdir/presnet/mission.htm; printed Oct. 8, 1998.

"Radical Pill Makes Banyan Healthy Again," The Boston Globe, Nov. 22, 1999.

Hui et al., "A Dynamic IP Addressing System for Internet Telephony Applications," Computer Communications, NL, ELSEVIER Science Publishers BV, Amsterdam, vol. 21, No. 3, Mar. 25, 1998, pp. 254–266, XP004115293.

Eriksson, "Internet Directory Services With Click–To–Dial," Ericsson Review, SE, Ericsson. Stockholm, No. 3, Jan. 1, 1998, pp. 118–125, XP000783250.

Yu et al., "A Multimedia Gateway For Phone/Fax and MIME Mail," Computer Communications, NL, ELSERVIER Science Publishers BV, Amsterdam, vol. 20, No. 8, Aug. 25, 1997, pp. 615–627, XP004126715.

* cited by examiner

```
FULL NAME                           HOME ADDRESS
   TITLE {Dr., Miss, Mr., Mrs., Ms.}   STREET
   FIRST                               CITY
   MIDDLE                              STATE/PROVINCE
   LAST                                ZIP/POSTAL CODE
   SUFFIX { I, II, III, Jr., Sr. }     COUNTRY/REGION
   NICKNAME                         OTHER ADDRESS
PERSONAL                               STREET
   BIRTHDAY                            CITY
   SPOUSE'S NAME                       STATE/PROVINCE
   ANNIVERSERY                         ZIP/POSTAL CODE
   PHOTO                               COUNTRY/REGION
COMPANY                             BUSINESS PHONE
   JOB TITLE                        BUSINESS MOBILE
   EMPLOYEE TYPE                    BUSINESS FAX
   EMPLOYEE IDENTIFIER              BUSINESS PAGER
   DEPARTMENT                       HOME PHONE
   GROUP                            HOME MOBILE
   PROFESSION                       HOME FAX
   MANAGER                          E-MAIL ADDRESS
   ASSISTANT                        WEB ADDRESS
   PHOTO                            VPIM ADDRESS
   USER NAME                        VOIP ADDRESS
BUSINESS ADDRESS                    CERTIFICATES/DIGITAL ID'S
   STREET
   CITY
   STATE/PROVINCE
   ZIP/POSTAL CODE
   COUNTRY/REGION
   MAIL STOP
   BUILDING/FLOOR
   OFFICE NUMBER
```

FIG. 2

METHOD AND APPARATUS FOR CORRELATING A UNIQUE IDENTIFIER, SUCH AS A PSTN TELEPHONE NUMBER, TO AN INTERNET ADDRESS TO ENABLE COMMUNICATIONS OVER THE INTERNET

CROSS REFERENCE TO RELATED APPLICATION

This application is a continuation-in-part of U.S. Ser. No. 09/226,901, filed on Jan. 8, 1999, and a continuation-in-part of U.S. Ser. No. 09/092,764, filed on Jun. 5, 1998, to which priority is claimed and which are hereby incorporated by reference in their entirety.

FIELD OF THE INVENTION

The present invention relates to a directory service for enabling communications over a data network such as the Internet, and more particularly to the use of a unique identifier (for example, a PSTN telephone number) with this directory as a means for acquiring the associated data network address information for an intended recipient of a communication.

BACKGROUND OF THE INVENTION

The Public Switched Telephone Network (PSTN) is a well-known and pervasive communications network that utilizes unique telephone numbers for setting up telephone calls. Millions of users all over the world have been assigned unique telephone numbers; moreover, users understand how to set up telephone calls to desired destinations by dialing such numbers. Originally conceived to carry real-time voice communications, the role of the PSTN has expanded to include other types of communications as well, including data. Facsimile is a well-known example of data communication over the PSTN.

The Internet, a data network, has more recently become well-known and pervasive. Unlike the PSTN which utilizes circuit switched technology, the Internet utilizes a packet switched technology. Compared to circuit switched networks, packet switched networks are commonly acknowledged to be far more efficient for the transport of information. Generally, charges for use of the PSTN are time based (i.e., cents per minute of use) whereas charges for use of the Internet are usually flat monthly fees. Reflecting its increased efficiency, the cost for use of the Internet is less than that of the PSTN. As a further distinction between the two, the Internet utilizes an addressing structure completely different from the PSTN. It employs unique domain names (e.g., "xyz.com") and associated, unique Internet Protocol (IP) addresses (e.g., "249.123.356.295") for establishing packet based communications between systems. Note that, like the PSTN, the Internet can be used to carry voice communications; however, a PSTN telephone number cannot be used to set up a telephone call on the Internet.

In general, the lure of communication via the Internet, compared to communication via the PSTN, is lower cost to the end user. Thus, in order to reduce costs, individuals and businesses seek to shift more and more communications traffic from the PSTN to the Internet. Such "traffic" may include real-time voice, fax, voicemail, unified messaging, etc. Today, many "Internet enabled" communication systems exist which allow the transport of such traffic over the Internet. Normally, such systems accept a standard telephone number from a user to address a communication. They then consult either an internal directory or other local directory to translate the telephone number into the required Internet Protocol (IP) address of the destination system. Unfortunately, such internal or local directories (databases) are, by their nature, very restricted in scope. For example, they may meet the need for communications occurring within a company, but the IP addresses for systems outside the company (remote addresses) will likely exist only for a limited number of frequently dialed destinations. If an IP address is unavailable in the local database, the communication is typically handed off to the PSTN. An ancillary problem exists with purely local directories: it is difficult to maintain accurate information on remote addresses due to the frequent movement of individuals both within a given company and between different companies.

In summary, the restricted addressing capability of a local directory severely circumscribes the utility of these new IP-enabled communication systems. The limited information contained in such local directories results in many call diversions to the PSTN, and further, increased administration costs associated with maintaining local databases.

SUMMARY OF THE INVENTION

The present invention is directed to a method and apparatus designed to simplify communication between end users (source and destination) on a data network. More specifically, the invention provides a database on a data network to relate a unique identifier attached to a user, to a data network address by which the user may be reached. Presumably, the unique identifier is one readily available to those desiring to communicate with the user. For example, it may take the form of a telephone number by which the user is commonly reached. According to one aspect of the invention, a method is provided for registering a unique identifier and an associated Internet address with a directory service (DS) that is accessible on the Internet. The directory service can then be accessed with a request for resolution of the unique identifier to its associated Internet address, wherein the directory service resolves the associated Internet address in response to the request.

According to another aspect, an apparatus of the invention comprises a directory service (DS), accessible via a data network, of unique identifiers and associated data network addresses.

In a preferred embodiment, the unique identifier is a telephone number, as provided by the PSTN. The data network may take the form of the commonly available Internet. The directory service would thus provide resolution of the telephone number of an intended recipient, to an associated Internet address for the intended recipient. The directory may also contain other information which may be useful in setting up a communication link between users. Such other information may also include particular requirements of the destination system, for example, the required format of a communication.

By way of example illustrated in FIG. 1, a method is provided for contacting an end user on the Internet comprising the steps of:

a first communication system (CS-1) 2 serving a first end user (EU-1) 1 providing (via a telephone type key pad 5) a telephone number of a second end user (EU-2) 3 to a directory service (DS) 12 accessible via the Internet 10, the DS comprising a compilation of telephone numbers and associated Internet addresses for end users;

searching the DS, based on the telephone number of EU-2, for an associated Internet address of a second communication system (CS-2) 4 serving EU-2; and EU-1 contacting EU-2 via the Internet based on the associated Internet address of CS-2.

If an Internet address is not available, the call is completed via the PSTN 8.

The contacting step may comprise at least one of real-time voice, voicemail, unified messaging, fax, or remote printing. An Internet address is defined to include any one of a variety of addressing mechanisms used in the Internet space. These include the more commonly known Internet Protocol (IP) address generally associated with an individual piece of equipment (an IP enabled fax machine, for example), the Simple Mail Transport Protocol (SMTP) e-mail address, and the Voice Profile for Internet Mail (VPIM) voicemail system address. Thus, by way of example, the Internet address of the recipient may be an IP address of an IP-telephone of CS-2, an IP address of an IP-mobile phone of CS-2, an IP address of an IP-PBX of CS-2, a VPIM address of a voicemail system of CS-2, an SMTP address of a unified messaging system of CS-2, an SMTP address of an e-mail system of CS-2, an IP address of a fax machine of CS-2, or an IP address of a printer of CS-2. For purposes of clarification, an IP-PBX is a Private Branch Exchange telephone switch which contains a connection to the Internet as well as traditional connections to the PSTN. Normally, a PBX is located on a customer premises.

The method and apparatus of the invention is provided to multiple end users, wherein each user may be charged a fee for being listed (registered) in the directory service (DS) or a fee for utilizing the DS. This fee may be for example a fixed fee, either on a one-time basis or periodic, or a fee based on the amount of usage of the DS. According to another aspect of the invention, a method is provided comprising free registration of end users in the DS and a fixed fee is billed only to those users who are determined to be "active users" of the DS. In one embodiment, an active-user is defined as a user record that is requested by a communications device in a predetermined period of time, e.g., at least once per month. Further alternatives are no fee for registration or usage, but a fee to advertisers for including advertisements with the service.

According to another aspect of the invention, an apparatus is provided comprising:
   an external directory service (DS) accessible via the Internet;
   the DS comprising registered unique identifiers and associated Internet addresses; and
   an interface to the DS for multiple Internet-enabled communication systems. The multiple communication systems may include, for example, Internet enabled PBX, voicemail, fax, unified messaging, and remote printing systems. Each of these systems may contact the directory service using one or more different protocols, such as Lightweight Directory Access Protocol (LDAP) or Domain Name System (DNS), to resolve the registered unique identifier to an associated Internet address.

According to another aspect of the invention, a method and apparatus are provided for associating more than one Internet address with a single unique identifier. In this case, each Internet address would relate to a different type of communications system. The directory service would use information contained within the request to determine which Internet address is the proper one for a given system. In a preferred embodiment, a single telephone number can be related to: an Internet address for a real-time voice communications system (for example an IP-PBX, IP telephone or IP wireless telephone); an Internet address for a voice messaging communications system (for example a VPIM enabled voicemail system); an Internet address for a unified-messaging system; an Internet address for an e-mail system; and an Internet address for a fax machine or a network printer.

According to another aspect of the invention, a method and apparatus are provided for registering end users with the directory service. The end user registry may be based upon a unique identifier, e.g., a telephone number, and associated Internet address. A single end user, or an administrator for a group of end users, may contact the directory service via a web browser and utilize Hypertext Transport Protocol (HTTP) to access the registration service.

These and other features of the present invention will be more particularly described with respect to the following detailed description.

BRIEF DESCRIPTION OF THE DRAWINGS

FIG. 2 is an example of a directory service (DS) record for an end user showing various types of information that the DS may contain.

Figure 1:
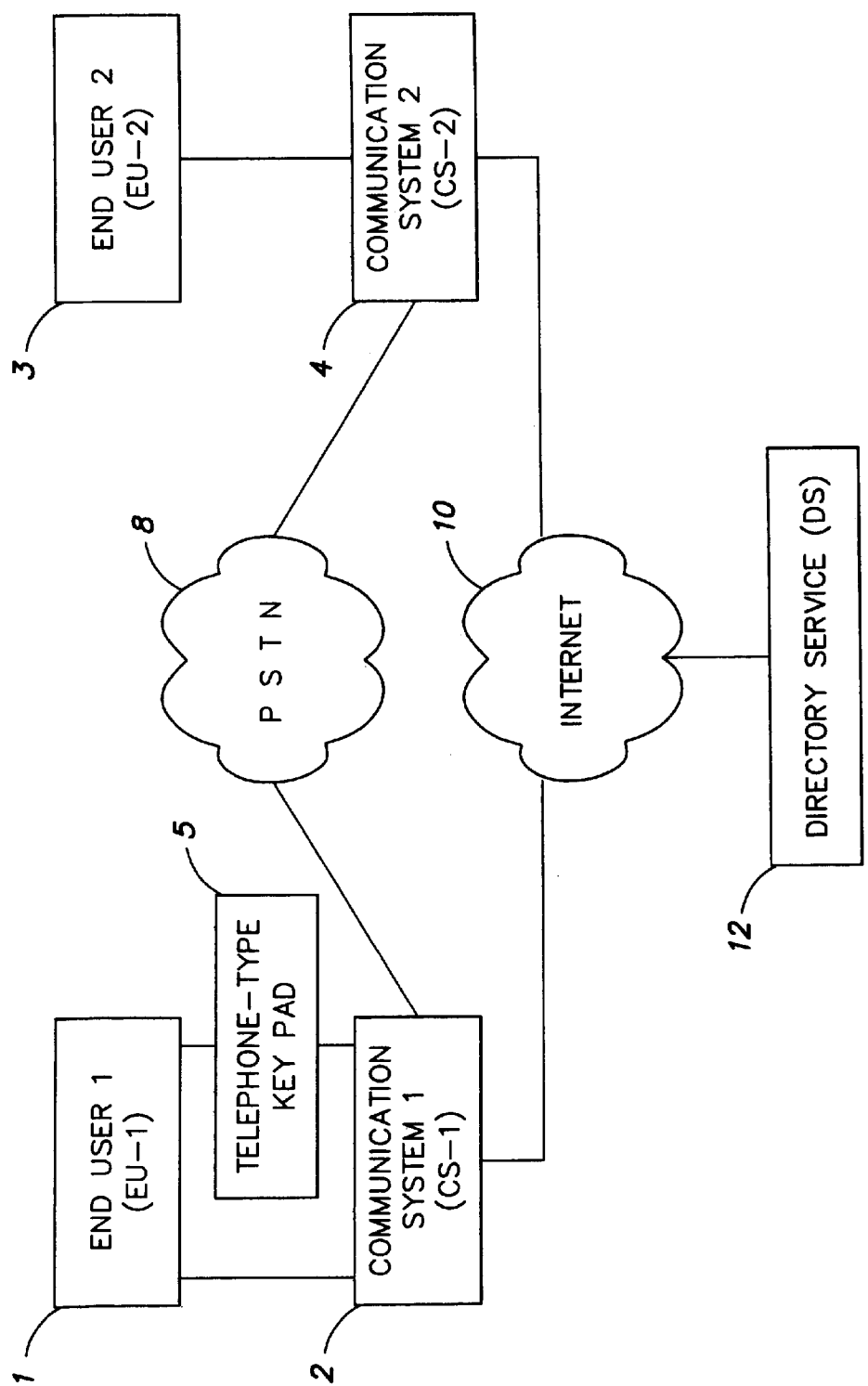
FIG. 1 is a schematic diagram of two alternative communication networks, the PSTN and the Internet; it shows the Internet accessibility of the directory service (DS) of this invention and the Internet connectivity between the sending (source) and the receiving (destination) communication systems.

DETAILED DESCRIPTION
THE DIRECTORY SERVICE

A "data network" is defined as a network designed for the efficient transport of data and which carries that data in a digital form in packets or cells. This is contrasted with the circuit switched network structures used by the world-wide Public Switched Telephone Network (PSTN).

An internet is one type of data network. Physically, an internet is a collection of packet switching networks interconnected by gateways along with the protocols that allow them to function logically as a single, large, virtual network. When written in upper case, Internet refers to the collection of networks and gateways that use the TCP/IP protocol suite and function as a single, cooperative virtual network. The Internet provides universal connectivity and three levels of network services; unreliable, connectionless packet delivery; reliable, full duplex stream delivery; and application level services like electronic mail that build on the first two. See D. Comer, Internetworking With TCP/IP, vol. 1, p.

492–493, Prentice-Hall Inc. (1991). Most of the written information about TCP/IP and the Internet, including its architecture, protocols, and history can be found in a series of reports known as "Requests For Comments" or RFCs. RFCs are available electronically from the Internet Network Information Center (NIC) at service @ nic.ddn.mil. See D. Comer at pp. 447/–475 for a list of RFCs arranged by topic.

A "network address" designates, in general, a destination address on a data network. It includes an "Internet address" wherein Internet address includes Internet Protocol (IP) Address, SMTP e-mail address, VPIM address, or any one of a variety of other address protocols used on the Internet. The term Internet address may also include any additional information which may be required by communication systems to establish communication links over the Internet.

An Internet protocol (IP) address is a 32-bit address assigned to hosts that want to participate in a TCP/IP internet. IP addresses are the abstraction of physical hardware addresses just as an internet is an abstraction of physical networks. An IP address consists of a network portion and a host portion. This partition enables efficient routing of packets.

To further define terms which may be unfamiliar, a PBX is a Private Branch Exchange telephone switch; it is normally installed at a customer site and is used to provide telephone service internal to the site as well as service to the outside world via the PSTN. An IP-PBX is a similar device which contains a connection to the Internet as well as the traditional connections to the PSTN; it is thus capable of connecting calls, either via the Internet or the PSTN. A Centrex system performs a service similar to a PBX; in this case, however, the equipment performing the switching function is located with the local telephone service provider. Centrex service provides a customer with "PBX-like" capabilities but on a fully outsourced basis. An IP-Centrex system also contains a connection to the Internet; it is thus capable of connecting calls, either via the Internet or the PSTN. In the provision of telephone service, all telephones and PBX's within a local area are connected to a central switching facility called a Central Office (CO). The CO provides connectivity for telephones within the local area; it also connects calls to areas beyond the local area via the PSTN. An IP-CO is connected to the Internet as well as the PSTN, allowing it to complete calls beyond the local area by either type of network. An IP-CO may be utilized by a local phone company or by an alternative network carrier like a cable TV company to provide IP based communication services.

The "directory service" (DS) is a directory that resides on a data network such as the Internet. It converts "unique identifiers" (for example, standard telephone numbers) into corresponding network addresses (for example, IP addresses). The service allows a communication system (for example, an IP-PBX) to utilize the Internet as a communication carrier alternative to the PSTN, while allowing end users to utilize non-Internet related unique identifiers (e.g., telephone numbers) as a common addressing scheme. The location of the physical directory may be centralized or distributed on the data network according to the needs of the users, the provider of the DS (e.g., a commercial entity that maintains and bills for registration and/or access to the DS), or the technology employed.

Examples of communication systems that could utilize the DS to convert a unique identifier into an Internet Address include, among others:
 IP enabled PBX systems
 IP enabled Centrex systems
 IP enabled Central Office systems
 IP enabled telephones
 IP enabled wireless phones (mobile phone or cell phone)
 IP enabled voicemail systems
 IP enabled fax machines
 Unified messaging systems
 Remote printing systems Examples of unique identifiers that communication systems might use to identify a station set, person, place or organization include, among others:
 Telephone numbers
 Random unique numbers
 Personal identity codes
 Social Security Numbers
 Recorded spoken name
 Voice prints
 Finger prints
 Retina scans In various DS embodiments, one or more of these identifiers are used to search the DS database and locate an associated network address.

Examples of data network address information that could be stored in the DS and utilized by various communication systems include, among others:
 IP (Internet Protocol) addresses
 SMTP/MIME (Simple Mail Transport Protocol/Multiple Purpose Internet Mail Extension) addresses
 VPIM (Voice Profile for Internet Mail) addresses A variety of other information may be included in the DS database, such as the following exemplary record of one end user:
 Full Name
   Title {Dr., Miss, Mr., Mrs., Ms.}
   First
   Middle
   Last
   Suffix {I, II, III, Jr., Sr.}
   Nickname
   Spoken Name
 Personal
   Birthday
   Spouse's Name
   Anniversary
   Photo
 Company
   Job Title
   Employee Type
   Employee Identifier
   Department
   Group
   Profession
   Manager
   Assistant
   Photo
   User Name
 Business Address
   Street
   City
   State/Province
   Zip/Postal code
   Country/Region
   Mail Stop Building/Floor
Office Number
Home Address
  Street
  City
  State/Province
  Zip/Postal code
  Country/Region
Other Address
  Street
  City
  State/Province
  Zip/Postal code
  Country/Region
Business Phone
Business Mobile
Business Fax
Business Pager
Home Phone
Home Mobile
Home Fax
E-mail Address
Web Address
VPIM Address
VoIP Address
Certificates/Digital ID's FIG. 2 illustrates an example of such a record 24 stored in the directory service. The information in each record would be indexed (mapped) to enable searching and resolution of requests based on various combinations of inputs/outputs.

The DS database may also contain information related to the destination (addressed) communication systems or devices. For example, the unique identifier (telephone number) may correspond to an IP enabled fax machine. In this case, the database would, in responding to the inquiry, include information indicating the nature of the destination machine and the required format of the communication (i.e., TIFF). As another example, the unique identifier may correspond to a networked printer. In this case, the database response would include the proper printer format for the communication. More generally, each type of communication system may have a unique formatting requirement for the communication it receives. The DS, in responding to an inquiry, will so notify the inquirer (source) to be sure the communication is properly formatted for the receiving system.

Figure 3:
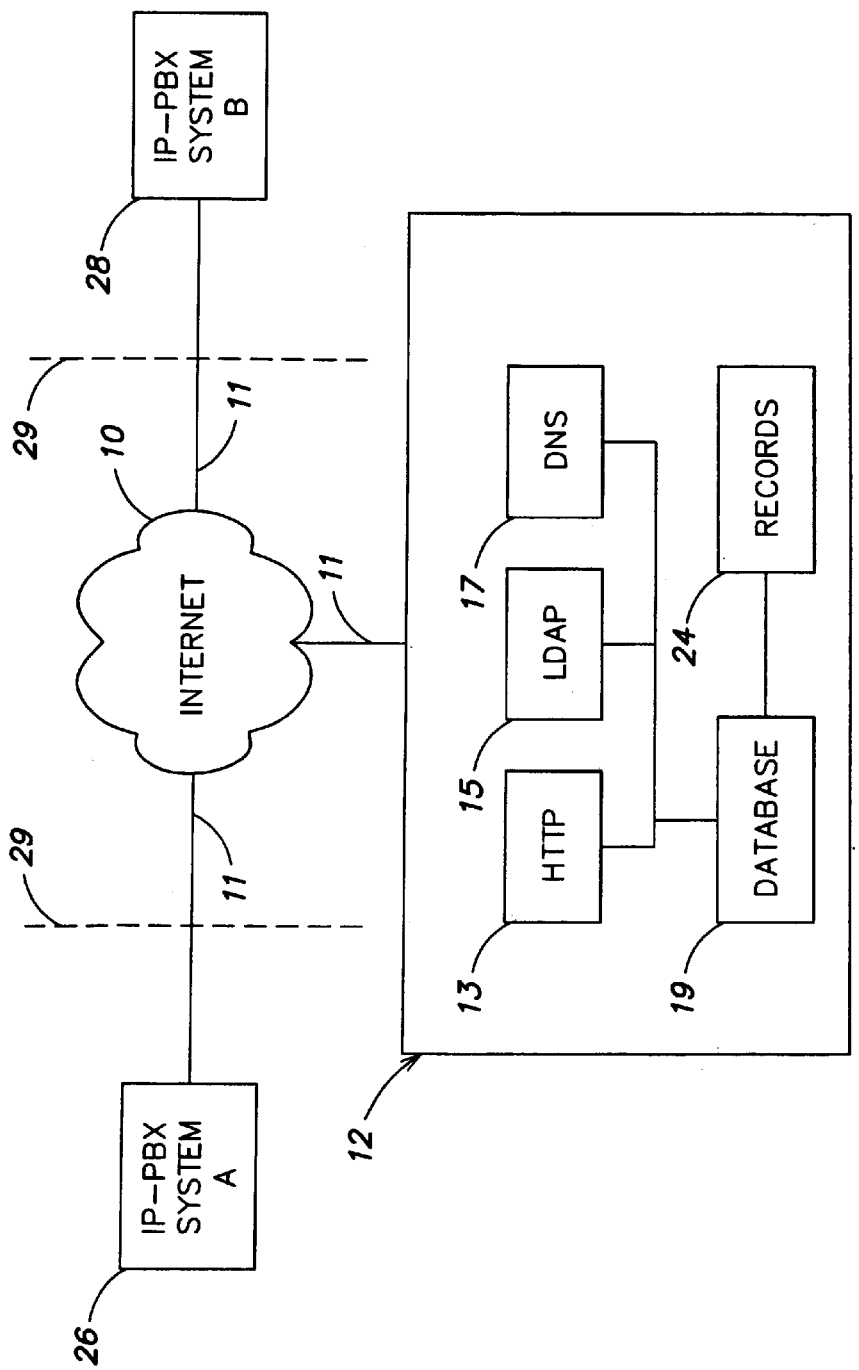
FIG. 3 is a schematic diagram of the components of the DS and its interface with an IP-PBX sending system and an IP-PBX receiving system.

FIG. 3 is a diagram of one embodiment of the directory service (DS) 12 comprising a computer that contains a database 19 (of records 24) and associated interface modules including HTTP module 13, LDAP module 15, and DNS module 17. The interface modules contain programs for accessing the database and interfacing with various communication applications that utilize the directory service. In this regard, HTTP stands for Hypertext Transport Protocol, LDAP stands for Lightweight Directory Access Protocol, and DNS stands for Domain Name System. All of these well-known communication protocols enable communication systems to contact the DS; this will be described in greater detail below in regard to FIG. 5.

Figure 5:
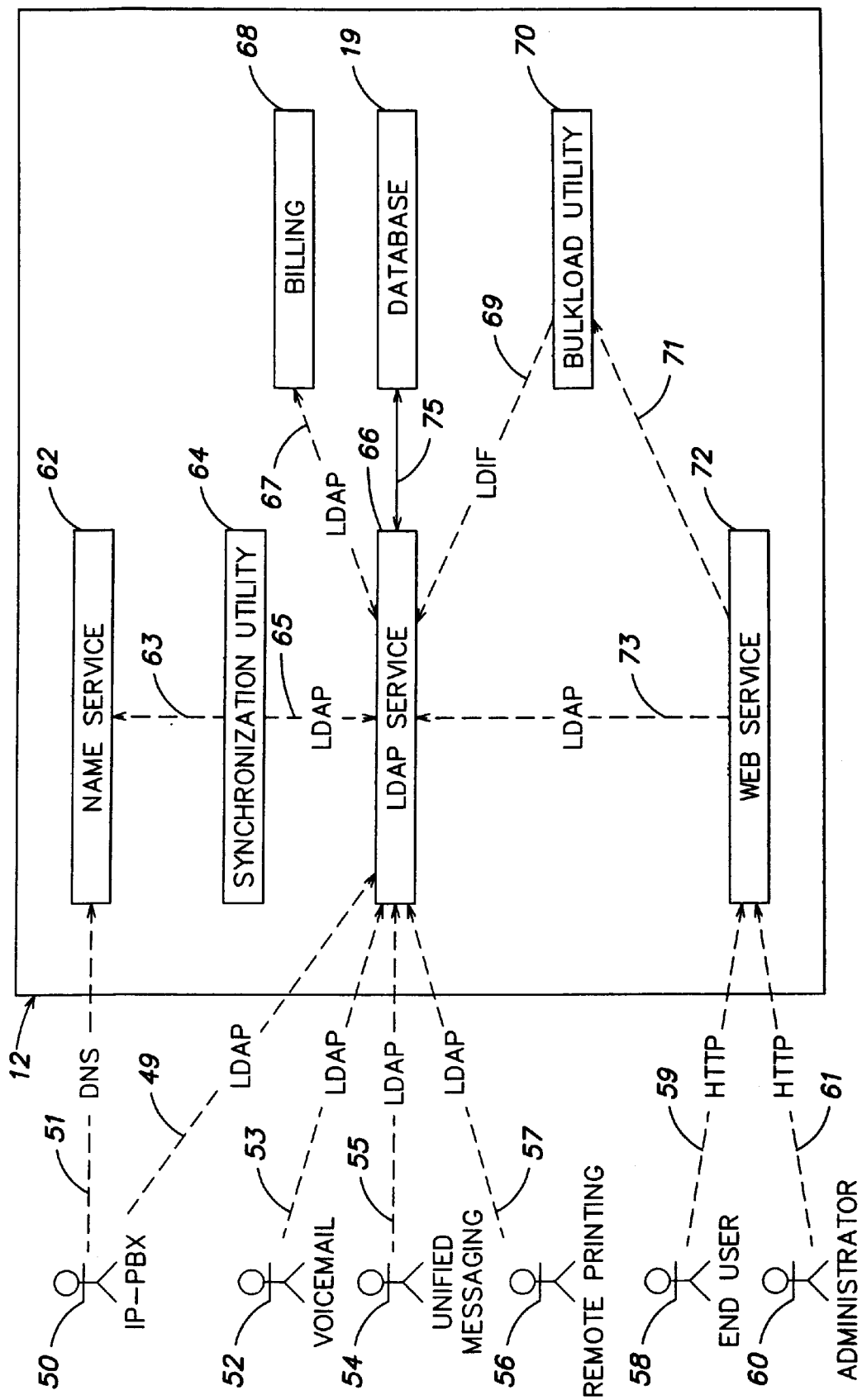
FIG. 5 is a schematic diagram of the interaction of various communication systems with the DS.

Two end users in FIG. 3 are represented schematically as a source communication application IP-PBX A (26), and a destination IP-PBX B 28 (an IP-PBX is a Private Branch Exchange (PBX) containing a connection to the Internet via lines 11). The source A and destination B are connected to one another through the Internet 10. Dashed lines 29 denote that each IP-PBX 26 and 28 is a Private Branch Exchange residing on a customer premises, as opposed to being a part of the public Internet 10. An IP-PBX is just one example of a communication system that may access the DS to resolve a destination telephone number into an associated Internet address. The DS may return different address information for the same unique identifier based on the type of communication application accessing the service, the contents of the request, and/or the information contained in the directory for a particular end user. FIG. 5 illustrates various such communication systems including PBX system 50, voicemail system 52, unified messaging system 54, and remote printing system 56. In addition, end user 58, singly and/or as an administrator 60 of a group of end users, has access to the DS to enable registration and updating of records 24 in database 19.

Thus, the DS accepts a standard telephone number and returns an Internet address for a destination communication system or device, along with other pertinent destination information if available. The directory service supports a variety of applications and/or services including those described in summary form below; additional details are provided later in this specification.

VOICE MESSAGING APPLICATION

Sending a Voicemail Message Via a Data Network

User A at Company A desires to send a voicemail message to User B at Company B. User A accesses his voice mail system (VMS) and via a telephone keypad, enters a unique identifier (for example, a telephone number) corresponding to the recipient, User B, and records a message. The VMS A at Company A must now arrange for the transport of the message to VMS B at Company B. VMS A first reviews its internal database to determine if it contains an Internet address (for example, a VPIM address) corresponding to the unique identifier entered by User A. If it does not, it contacts the DS via the Internet for the information. Using the Internet address obtained from the DS, VMS A sends the recorded message via the Internet to the recipient, User B, at VMS B. Note that the PSTN is nowhere engaged in this transaction, thus all time dependent telecommunication charges normally associated with placing a telephone call are avoided.

The DS invention solves an addressing problem in this application. A voice mail system, by design serving a limited constituency, likely contains in its memory only a small fraction of the VPIM addresses it requires to complete calls. The DS, accessible through the Internet, contains a comprehensive database of such addresses and makes them available to all registered users of the service. Moreover, it is capable of translating any unique identifier into an address format specific to the receiving machine—in this case, translating a telephone number into a VPIM address. The DS thus allows communication links to be established over the Internet between disparate communication systems while allowing end users to utilize unique identifiers such as PSTN telephone numbers as an addressing mechanism.

Forwarding, Broadcasting or Replying to a Voicemail Message Over a Data Network

Just as in the previous example of "sending a voicemail message", all forms of voice messaging over the Internet require that a VMS convert a unique identifier like a telephone number into an appropriate Internet address. In all voice messaging applications, the DS invention solves an addressing problem of converting a unique identifier into the Internet address necessary to support the voice messaging application. In these examples, the DS, accessible through the Internet, contains a comprehensive database of VPIM addresses and makes them available to all registered users of the service. Moreover, it is capable of translating any unique identifier into an address format specific to the needs of the receiving machine—in this case, translating a telephone number into a VPIM address.

IP-PBX APPLICATION

An IP-PBX is an Internet Protocol enabled Private Branch Exchange telephone system that is capable of setting up telephone calls either over the Internet using IP technology or over the Public Switched Telephone Network using circuit switched technology. Alternatively, an IP-telephone is a telephone device that is also capable of sending and receiving telephone calls using the Internet or the PSTN.

User A, connected to an IP-PBX phone system, dials a telephone number for a destination party located outside of User A's IP-PBX phone system. The IP-PBX first accesses its internal directory to determine if a corresponding IP address is available for the destination IP-telephone or IP-PBX. Finding none, it then consults the DS via the Internet for the required information. Other supporting information may also be requested including: a list of relevant communication protocols, spoken name of the destination party, etc. If the IP address is available, the Internet is used to connect the call, bypassing the PSTN and its associated time dependent costs.

The DS invention solves an addressing problem in this application. An IP-PBX, by design serving a limited constituency, likely contains in its memory only a small fraction of the IP addresses it requires to complete calls. The DS, accessible through the Internet, will contain a comprehensive database of IP addresses and make them available to all users of the service. Moreover, it is capable of translating any unique identifier into an address format specific to the needs of the receiving machine—in this case, translating a telephone number into a IP address.

IP-CENTREX APPLICATION

An IP-Centrex system is capable of setting up telephone calls either over the Internet using IP technology or over the Public Switched Telephone Network using circuit switched technology.

User A, connected to an IP-Centrex phone system, dials a telephone number for a destination party located outside of User A's IP-Centrex phone system. The IP-Centrex system first accesses its internal directory to determine if a corresponding IP address is available for an IP-enabled telephone system at the destination. Finding none, it then consults the DS via the Internet for the required information. Other supporting information may also be requested from the DS including: a list of relevant communication protocols supported by the destination, spoken name of the destination party, etc. If an IP address is available, the Internet is used to connect the call, bypassing the PSTN and its associated time dependent costs.

The DS invention solves an addressing problem in this application. An IP-Centrex system by design, serving a limited constituency, likely contains in its memory only a small fraction of the IP addresses it requires to complete calls. The DS, accessible through the Internet, will contain a comprehensive database of IP addresses and make them available to all users of the service. Moreover, it is capable of translating any unique identifier into an address format specific to the needs of the receiving machine—in this case, translating a telephone number into a IP address. The DS thus allows communication links to be established over the Internet between disparate communication systems while allowing end users to utilize unique identifiers such as PSTN telephone numbers as an addressing mechanism.

IP CENTRAL OFFICE (IP-CO) APPLICATION

An IP-CO is an Internet Protocol enabled Central Office telephone system that is capable of setting up telephone calls either over the Internet using IP technology or over the Public Switched Telephone Network using circuit switched technology.

User A, connected to an IP-CO telephone switch, dials a telephone number for a destination party located outside of User A's IP-CO local calling area. The IP-CO first accesses its internal directory to determine if a corresponding IP-address is available for an IP-enabled telephone system at the destination. Finding none, the IP-CO then consults the DS via the Internet for the required information. Other supporting information may also be requested including: a list of relevant communication protocols, spoken name of the destination party, etc. If an IP-address is available, the Internet is used to connect the call, bypassing the PSTN and its associated time dependent costs.

The DS invention solves an addressing problem in this application. An IP-CO, by design, serving a limited constituency, likely contains in its memory only a small fraction of the IP addresses it requires to complete calls. The DS, accessible through the Internet, will contain a comprehensive database of IP addresses and make them available to all users of the service. Moreover, it is capable of translating any unique identifier into an address format specific to the needs of the receiving machine—in this case, translating a telephone number into a IP address. The DS thus allows communication links to be established over the Internet between disparate communication systems while allowing end users to utilize unique identifiers such as PSTN telephone numbers as an addressing mechanism.

IP-TELEPHONE APPLICATION

An IP-telephone is a telephone device that is capable of sending and receiving communications using the Internet or the PSTN for connectivity to other systems. The IP-telephone may be either a wireline or a wireless variety.

Using a standard PSTN number, User A dials a telephone number for a destination party. The IP-telephone first accesses its internal directory to determine if a corresponding IP-address is available for the destination system. Finding none, it then consults the DS via the Internet for the required information. Other information required to complete the communication may also be requested at this time (i.e., a list of relevant communications protocols supported by the receiver). If the IP address is available, the Internet is used to connect the call, bypassing the PSTN and its associated time dependent costs.

The DS invention solves an addressing problem in this application. An IP-telephone likely contains in its memory only a small fraction of the IP addresses it requires to complete calls. The DS, accessible through the Internet, will contain a comprehensive database of IP addresses and make them available to all users of the service. Moreover, it is capable of translating any unique identifier into an address format specific to the needs of the receiving machine—in this case, translating a telephone number into a IP address.

UNIFIED-MESSAGING APPLICATION

A unified messaging application is a communication system that allows end-users to access multiple forms of messages through either a common PC interface or a common telephone interface. Some of the more prevalent features of unified messaging applications are the ability to retrieve both e-mail and voicemail messages over the phone and the ability to send both e-mail and voicemail messages to destinations over the Internet in an e-mail format. Spoken e-mail is a term that refers to a voice message that is sent to a destination in an e-mail format—hence "spoken" e-mail.

User A accesses a unified-messaging system or application to send, forward or broadcast a spoken e-mail message to a destination party(s), User B. User A records a voice message and enters a telephone number to identify User B. The unified-messaging application first accesses its internal directory to determine if a corresponding Internet e-mail address is available for the destination telephone number(s) entered by User A. Finding none, the unified-messaging system accesses the DS via the Internet to determine if an e-mail address corresponding to the telephone number(s) is available for the destination party. At the same time, the unified-messaging system may request message format options acceptable to the destination communication system. If an e-mail address is available, the unified-messaging system formats the spoken e-mail message in a format that is acceptable to the destination e-mail system and sends the message via a data network to the destination e-mail address.

The DS invention solves an addressing problem in this application. A unified-messaging application likely contains in its memory only a small fraction of the world's Internet e-mail addresses it requires to complete message transmissions. The DS, accessible through the Internet, contains a comprehensive database of such addresses and makes them available to all users of the service. Moreover, it is capable of translating any unique identifier into an address format specific to the needs of the receiving machine—in this case, translating a telephone number into an e-mail address.

REMOTE PRINTING APPLICATION

This application allows a document transmitted over the Internet to appear in printed form at the destination location. This contrasts with another well-known messaging application, e-mail, in which the message appears at the destination in electronic format and is viewed on a display device such as a CRT or LCD display. In this latter case, a printed version of the document requires discrete action on the part of the receiver. Several alternative versions of this application are possible:

A user inserts a document into a standalone networked scanning device (for example, a Hewlett-Packard Digital Sender) and keys in a destination telephone number. The scanner first accesses its internal directory to determine if a corresponding Internet address is available for a destination printer assigned to the telephone number entered by the user. Finding none, it then consults the DS via the Internet for the IP address of a printer associated with the keyed-in telephone number. At the same time it may request the requisite printer driver information for the destination printer. The device then scans the document, formats it properly, and sends it via the Internet to the destination printer. The printer prints the document. At no time does the document reside at the destination in electronic format.

Alternative 1. The destination telephone number is that of a network enabled fax machine. When contacted, the DS relays this fact as well as the requisite IP address to the scanner. The scanner formats the document as a fax (for example, as a TIFF file) and sends it via the Internet to the destination fax machine. At no time is the PSTN utilized in the transaction; thus all associated time-dependent telephone charges are avoided.

Alternative 2. The source of the document is a PC. The document may be in any electronic format (e.g., Microsoft Word, Excel or image format such as TIFF or a bitmap). An application on the PC allows the user to request that the document be printed at the destination rather than appear in electronic format such as e-mail. The user inputs a unique identifier (for example, a telephone number) corresponding to the individual who is destined to receive the document. Using the Internet, the application on the PC relays the unique identifier to the DS along with a request for printer information. The DS responds with the IP address and related driver information of a printer proximate to the person owning the unique identifier. The PC application properly formats the document and sends it via the Internet to the destination printer. In addition, it may create a cover sheet for the document and include the name of the recipient, the number of pages in the document, a short message and other relevant information. The destination output device in this alternative may also be a fax machine, as described above.

The DS invention solves an addressing problem in this application. A remote printing application likely contains in its memory only a small fraction of the addresses it requires to complete message transmissions. The DS, accessible through the Internet, contains a comprehensive database of such addresses and makes them available to all users of the service. Moreover, it is capable of translating any unique identifier into an address format specific to the needs of the receiving machine—in this case, translating a telephone number or e-mail address into the IP address required to access the destination printer. Further, the DS provides to the sender the appropriate printer drivers required by the destination printer.

WEB REGISTRATION/ADMINISTRATION

A variety of mechanisms are available to accomplish the registration and administration of end user telephone numbers, IP addresses and other information within the directory. Two registration modes will be considered—bulk and individual. Bulk registration of telephone numbers and associated information provides the ability to supply the directory service with potentially large quantities of data. The information is first transformed into one of the supported directory service file formats (comma delimitated, LDIF); it is then transferred to the DS using either File Transfer Protocol (FTP) or specially designed capabilities on the DS Web site. Registration and administration of individual users is accomplished by commonly accepted means from a DS Web site.

RESOLVING TELEPHONE NUMBERS TO IP ADDRESSES

In one embodiment of the invention, the unique identifier submitted to the directory service is a PSTN telephone number; this is resolved (translated) by the system into a related Internet address. Fortunately, the format of telephone numbers worldwide adhere to a standard controlled by International Telecommunications Union (ITU) standard E.164. This standard helps make the DS resolution (translation) task predictable and thus minimizes its complexity. For example, an E.164 telephone number has a hierarchical structure, arranged in terms of country code which is 1 to 3 digits long, followed by a national designation. The national designation is defined by the particular country's numbering plan.

Earlier, a DNS interface to the DS was discussed as a viable access mechanism. However, a tractable system to enable translation of an E.164 telephone number with DS software requires the creation of a new name space or domain on the Internet. Ideally this would be a new generic top-level domain called ".tel" (i.e., the equivalent of .com or .gov). The Internet Corporation for Assignment of Names and Numbers (ICANN) controls the assignment of Root Domain Servers and the Generic Top Level Domains. Existing Generic

| Top Level Domains include: | |
|---|---|
| .com | commercial business |
| .org | non-profit organizations |
| .net | networks |
| .edu | educational institutions |
| .gov | government bodies |
| .mil | military |

ICANN, accessible via the Internet at www.icann.org, can be petitioned to adopt tel as an additional generic top level domain. As an alternative, the DNS component of the DS can be implemented by using a sub-domain within one of the existing Generic Top Level Domains with no approval required by ICANN.

The format of a standard E.164 telephone number can be modified for use by DNS software. By reversing the order of the elements, the DS will resolve from the most specific to the most general. By separating each digit in the national designation, one may construct an appropriate protocol without regard to or knowledge of nationally specific numbering plans. For example, in one system to translate the telephone number 1-800-555-1212 into an address, the software reverses the E.164 elements (i.e., country code, area code, local exchange and extension) and appends the ".tel" generic top level domain identifier. The resulting DS domain name address becomes: "2.1.2.1.5.5.5.0.0.8.1.tel". Alternatively, the DS would also accept the format: "8005551212.1.tel".

A directory interface based upon LDAP (Lightweight Directory Access Protocol) provides another mechanism for efficient resolution of a telephone number into an Internet address. LDAP systems are typically used where quick responses to requests and retrieval of relatively small amounts of information are required. Additionally, the information is expected to change very little over time (i.e., the information is static). By way of example, in a private corporate network, LDAP has been used for accessing a database of employee information—e.g., a first user enters a coworker's name; the LDAP directory responds by providing information such as the email address of the coworker, his/her office location, a picture of the coworker, how many years the coworker has been employed by the corporation, etc.

To resolve a telephone number into an Internet address, the LDAP software will also reverse the E.164 elements, but in this case, it need not append the ".tel" generic top level domain. In the above example the LDAP address will have the form: CC=1, ED=8, ED=0, ED=0, ED=5, ED=5, ED=5, ED=1, ED=2, ED=1, ED=2, where ED=E.164 digit and CC=country code. LDAP would also accept the format: CC=1, NSP=8005551212 where NSP=Nationally Significant Part.

IMPLEMENTATION

The DS can be configured to run under Sun Cluster 2.1 Software on a group of Sun Enterprise Class Computer Servers using RAID (redundant array of independent discs) based storage devices (available from Sun Microsystems, Inc., 901 San Antonio Road, Palo Alto, Calif. 94303 USA). These systems may be housed in an Internet Data Center with fully redundant subsystems, such as multiple fiber trunks coming from multiple sources, redundant power supplies, and backup power generators. The DS site may also utilize firewall technology to securely protect the information stored in the DS. Such systems are commonly used in application such as those described herein. Many variations will be apparent to those skilled in this art.

Figure 4:
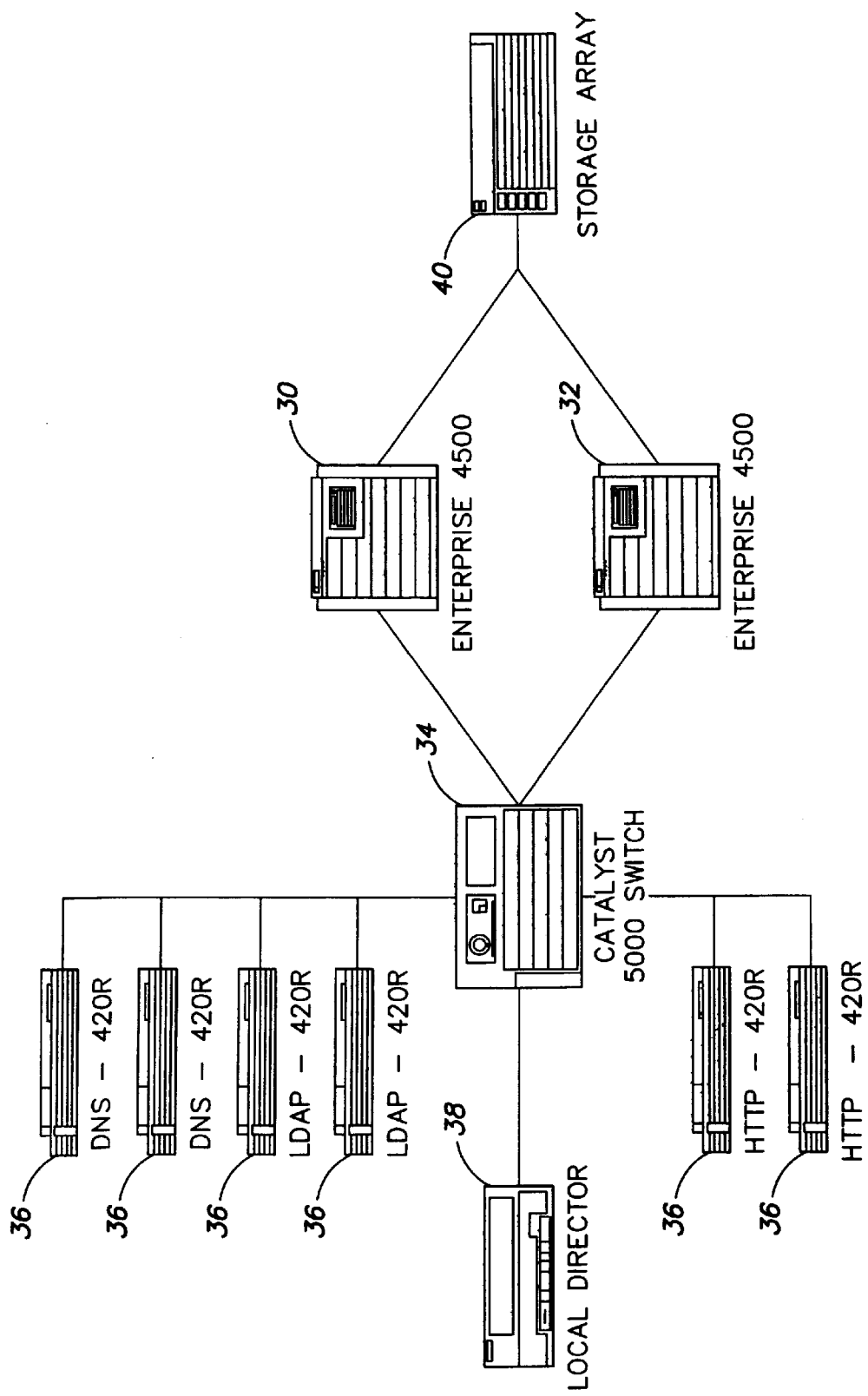
FIG. 4 is a schematic diagram of certain physical components of one embodiment of the DS.

By way of example, FIG. 4 shows two Sun Enterprise 4500 computer servers, each having 4–400 Mhz processors, 4 gigabytes (GB) of memory and 18 GB of internal disk/storage. These are connected through a Cisco Catalyst 5000 switch (available from Cisco Systems, Inc., San Jose, Calif. USA) to various Sun 420 R devices 36, each having 2–450 Mhz processors, 2 GB of memory, and 18 GB of internal disk/storage. Two of these 420 R devices are used for each of the DNS, LDAP, and HTTP software. A Cisco Local Director 38 is connected to the switch 34, and a Sun storage array 5200 (40), having 200 GB internal disk is connected to each of the Sun computer servers 30, 32. This selection and arrangement of hardware and software for implementing the directory service is given by way of example only and not intended to limit the scope of the present invention.

Lightweight Directory Access Protocol (LDAP) provides efficient transport in packet-based networks. LDAP software components are available off-the-shelf from a variety of sources. A recent release of LDAP, known as Oracle Internet Directory (OID) version 3 compatible LDAP directory, is a super-scalable version which permits a very large number of database entries (available from Oracle, 500 Oracle Parkway, Redwood City, Calif. 94065, USA). Any of the IP-PBX, voice mail, unified messaging and remote printing applications may contact the directory service using LDAP. The application accesses the directory service by making a function call to an external LDAP directory.

These same applications can also update the directory service with an up-to-date list of phone numbers and associated IP address information via an LDAP interface. This LDAP directory update software can be used to perform routine add/change/delete updates with the directory service.

To enable easy access to the information in the directory, one needs to know the structure of the directory database. The following resources can be used for designing an interface which accepts LDAP queries to the directory service: Java Server Pager (JSP); Java Servlet, Apache Web Server; Java Naming and Directory Interface (JNDI).

SEQUENCE DIAGRAMS ILLUSTRATING ACCESS TO DIRECTORY SERVICE

FIG. 5 is a schematic representation of various communications applications, e.g., IP-PBX 50, voicemail 52, unified messages 54, and remote printing 56, along with end user 58 and administrator 60, each of which can access DS 12 by one or more Internet communication protocols including DNS, LDAP, and HTTP. In this embodiment, the DS 12 includes a name service module 62, accessible on line 51 with DNS messages from IP-PBX 50. It further includes LDAP service module 66 connected by each of lines 49, 53, 55 and 57 to each of IP-PBX 50, voicemail 52, unified messaging 54 and remote printing 56. It further includes web service module 72 accessible on each of lines 59 and 61 with HTTP messages from end user 58 and administrator 60. Within DS 12, web service 72 sends LDAP messages on line 73 to LDAP service module 66. A synchronization utility module 64 synchronizes the address information in each of name service 62 (via line 63) and LDAP service 66 (via a line 65). Billing module 68 sends/receives LDAP messages on line 67 to/from LDAP service module 66. A bulk load utility module 70, used for registering large numbers of telephone numbers and associated Internet addresses into the database, receives various electronic messages from web service module 72 on line 71, and sends LDIF data on line 69 to LDAP service module 66. The database 19, of registered telephone numbers and associated Internet addresses, sends and receives messages on line 75 to and from LDAP service 66.

The flow charts of FIGS. 6–9 will be used to illustrate the sequence of operations and functionality of the various aforementioned components of DS 12.

IP-PBX Performs Destination IP Address Lookup

Figure 6:
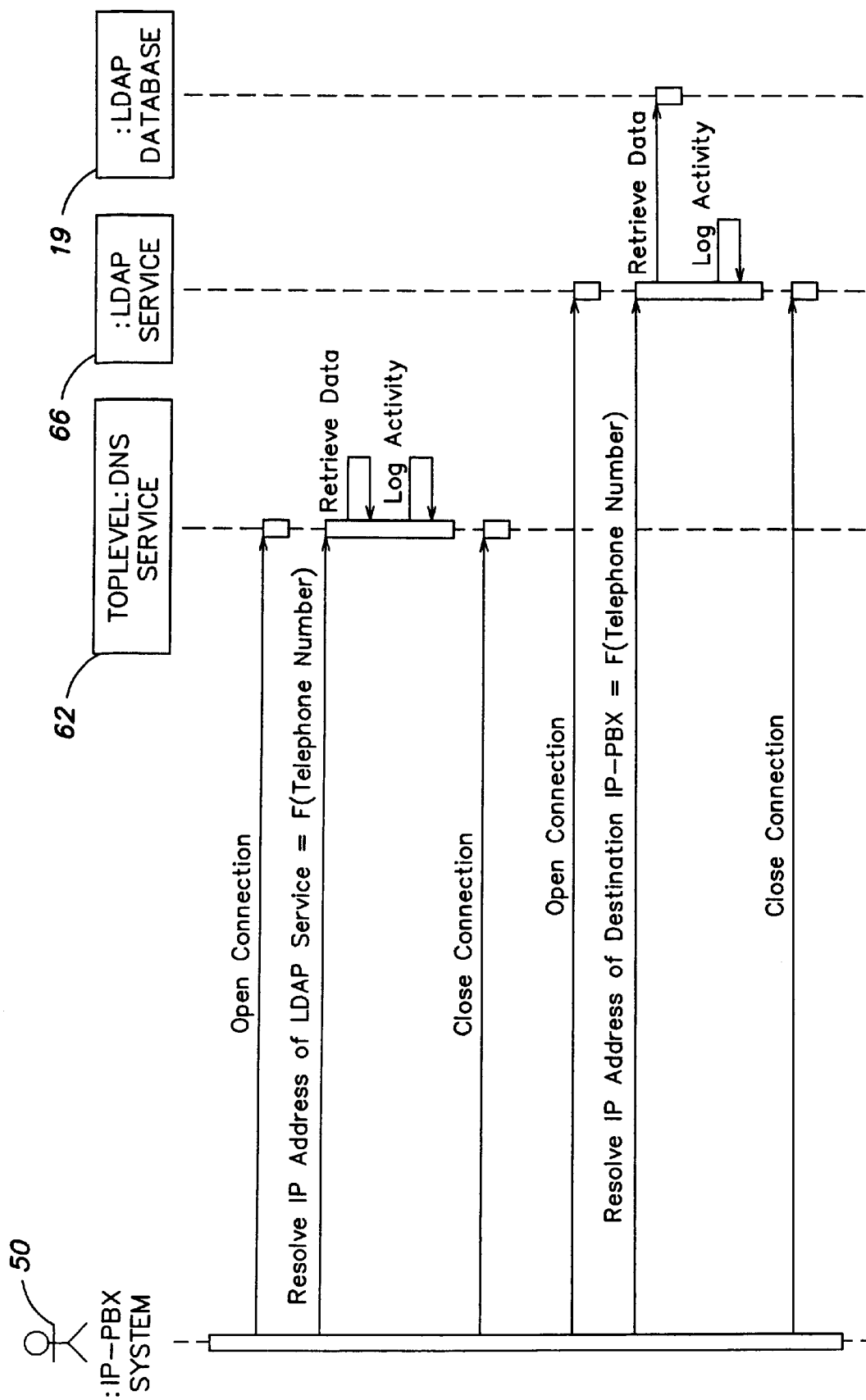
FIG. 6 is a flow diagram of the sequence of events which occur in one embodiment when an IP-PBX requests resolution of a unique identifier.

As illustrated in FIG. 6, the IP-PBX (50 in FIG. 5) connects to a top-level domain name system (DNS) service (62 in FIG. 5) to obtain the IP address of the LDAP service (66 in FIG. 5) based on a dialed telephone number. The dialed telephone number is supplied by an end user connected to the IP-PBX 50. The DNS service 62 returns the associated IP address of LDAP service 66 and logs the activity. Once IP-PBX 50 has successfully retrieved the IP address of the LDAP directory, it closes the connection to the DNS server 62 and opens a connection to the LDAP service 66. It then sends a request to resolve the telephone number of the destination IP-PBX to its associated IP address, by querying the LDAP service. The LDAP service retrieves the destination IP-PBX address from database 19, and logs the activity. The source IP-PBX 50 then closes the connection to DS 12 and continues to process a call to destination IP-PBX with the associated IP address.

Voicemail Performs Destination VPIM Address Lookup

Figure 7:
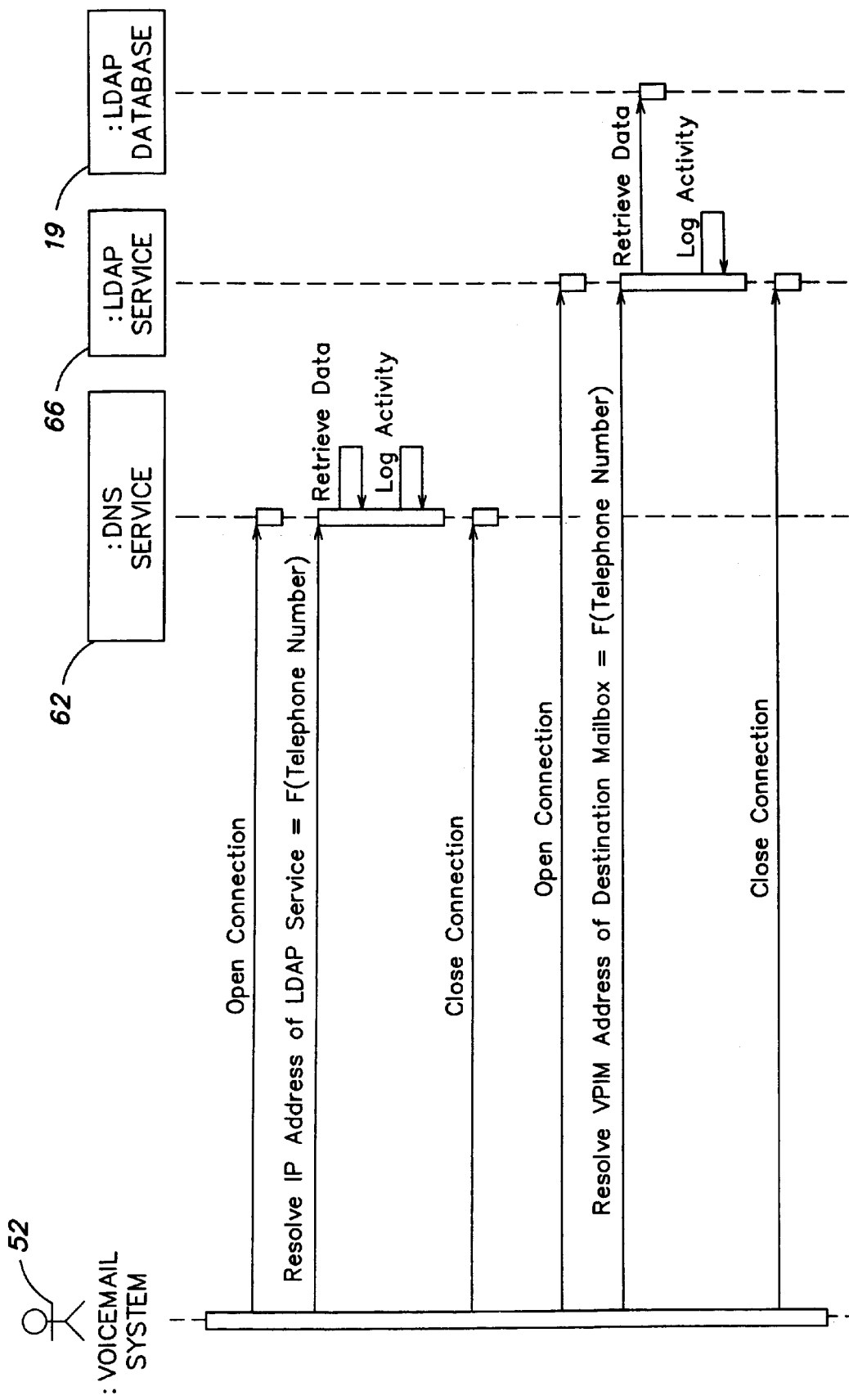
FIG. 7 is a flow diagram of the sequence of events which occur in one embodiment when a voicemail system requests resolution of a unique identifier.

In the flow chart of FIG. 7, a source voicemail system accesses the DNS service, similar to the process described with respect to the source IP-PBX system in FIG. 6. Although this connection is not illustrated in FIG. 5, it will be otherwise described with regard to the flow chart of FIG. 7.

The voicemail system (52 of FIG. 5) connects to the top level DNS server 62 to obtain the IP address of the LDAP service 66 based on a dialed telephone number—this is the same procedure as described with respect to FIG. 6. The DNS service returns the IP address and logs the activity. Once the voicemail system has successfully retrieved the IP address of the LDAP directory, it closes the connection to the DNS service and opens a connection to the LDAP service 66. It then sends a request to resolve a telephone number to the VPIM address of the destination mailbox by querying the LDAP service 66. VPIM is a standard protocol, Voice Profile for Internet Mail (VPIM), developed by the Electronic Messaging Association (EMA), a group of independent voicemail and e-mail manufacturers. VPIM allows different voicemail systems to transfer messages to one another, even if each VMS is made by a different manufacturer with its own proprietary protocol. VPIM is built on top of the enhanced Simple Mail Transport Protocol/Multiple Purpose Internet Mail Extension (SMTP/MIME) that allows each VMS to send and receive messages, such as voice messages, to one another over the Internet. The LDAP service 66 retrieves the destination VPIM address from database 19, and logs the activity. The voicemail system 52 closes the connection and continues processing the voicemail message for transmission on the Internet to the destination voicemail system.

Although not explicitly described herein, the unified messaging system 54 and remote printing system 56 can utilize similar flow sequences for resolving destination telephone numbers to destination Internet addresses.

Administrator Bulk Loads Entries to DS Database

Figure 8:
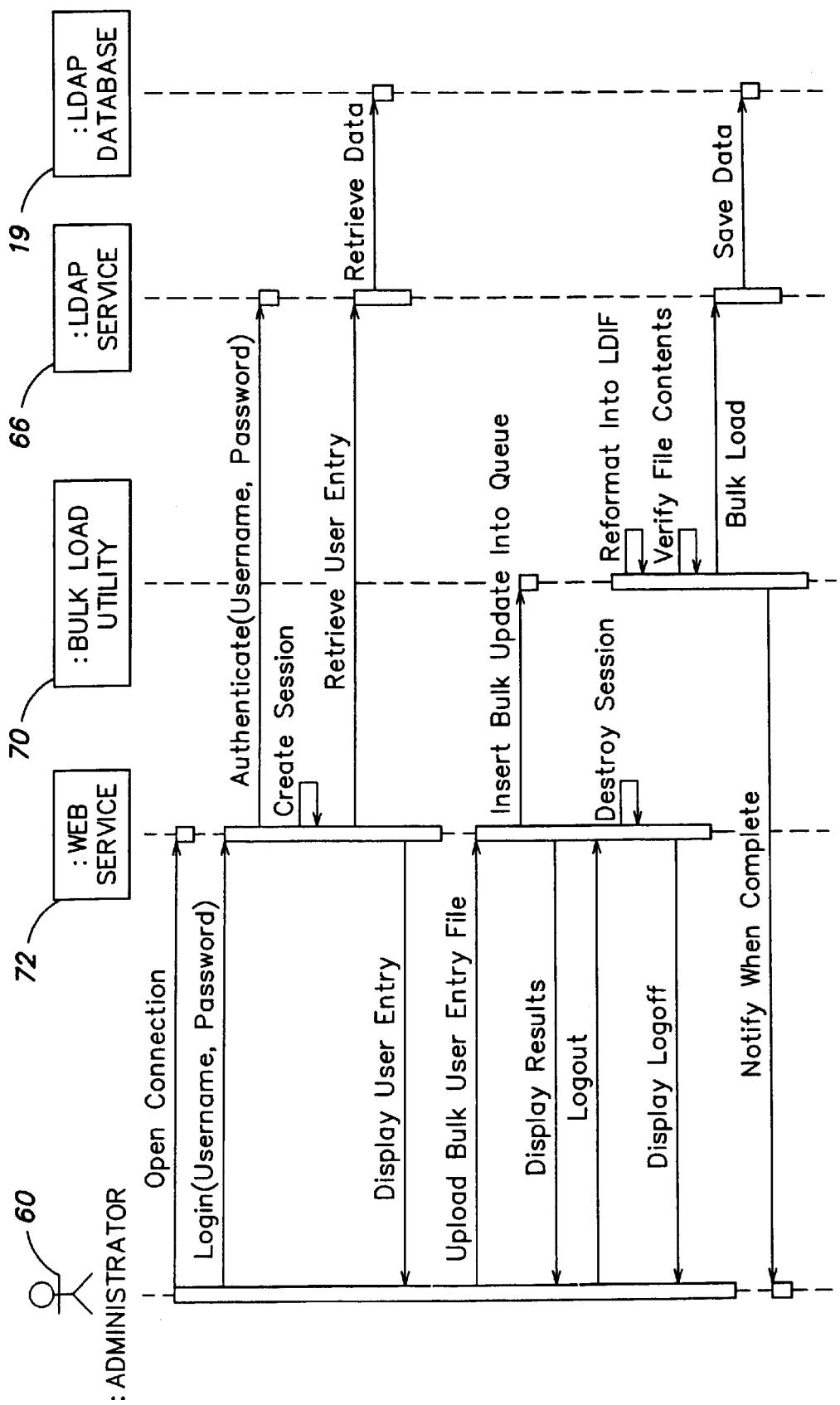
FIG. 8 is a flow diagram of the sequence of events which occur in one embodiment when an administrator bulk loads information into the DS database.

FIG. 8 is a flow sequence which illustrates the steps which occur when an administrator (60 in FIG. 5) registers a large number of telephone numbers and associated Internet addresses, into database 19.

Administrator 60 accesses DS 12 via the web service 72. The administrator provides a user name and password via a secure connection to web service 72. The user name and password are authenticated by LDAP service 66 and the web service then creates a session for the user. Next, the web service retrieves a user entry form from the LDAP service 66 and displays it back to the administrator. The administrator now uploads a bulk user entry file to the web service. The web service 72 inserts the file into the bulk load utilities module 70 for batch processing. The web service then displays to the administrator a job number and indication that the administrator will be notified when processing is complete. The bulk load utility 70 begins processing the entry by reformatting the file into LDIF format and verifying its contents. The data is then loaded into the LDAP service 66 and notification sent to the administrator when complete.

In the embodiment of FIG. 5, the bulk load utility 70 receives a file from web service 72, determines the format, and converts it to an LDIF format; it then sends the LDIF data to LDAP service 66. In an alternative embodiment, an administrator 60 may send an LDIF file directly to web service 72, in which case conversion is not required. As a further alternative, in cases where it is only required to update a few records in DS 12, an end user or administrator may send LDAP requests directly to the LDAP service 66.

End User Updates a User Entry

Figure 9:
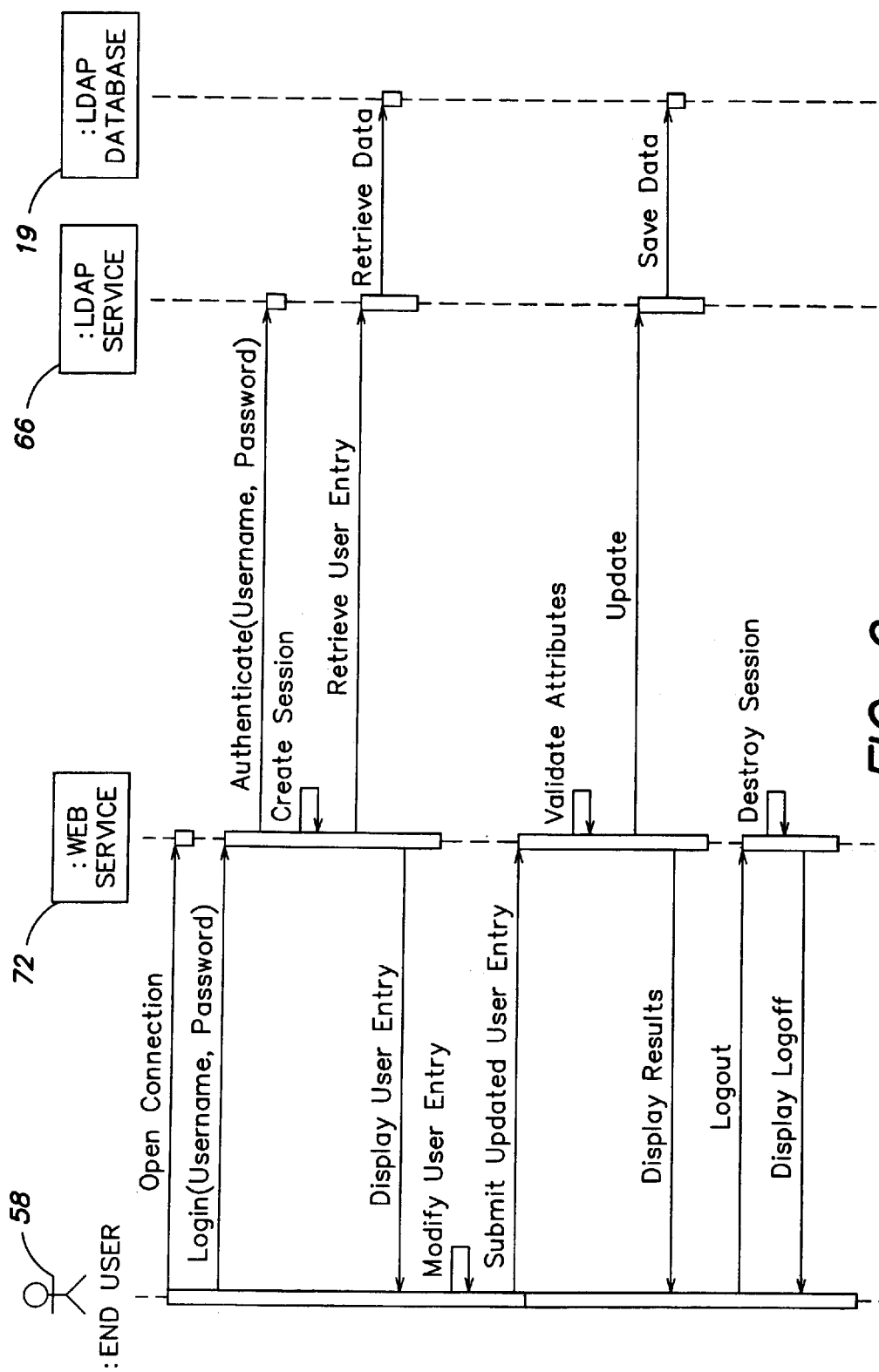
FIG. 9 is a flow diagram of the sequence of events which occur in one embodiment when an individual user modifies information in the DS database.

FIG. 9 illustrates a flow sequence for an end user updating a user entry via a web interface.

An end user (58 in FIG. 5) accesses the DS 12 via web service 72 and provides a user name and password via a secure connection. The user name and password are authenticated by the LDAP service 66 and the web service 72 creates a session for the user. Next, the web service retrieves a user entry (record) from the LDAP service 66 and displays it back to the user. The user now modifies the contents of the entry and submits the changes back to the web service. The web service validates the contents of the entry and updates the LDAP service. The web service displays a successful completion of the update. The end user then logs off the web service, the web service ends the session and displays to the end user the successful log-off operation. In the above embodiment, the source communication application can send either a DNS or an LDAP request message to the DS 12. Two sources of data are maintained in the DS 12, namely data in name service 62 and data in LDAP service 66. Synchronization of the data is achieved by the synchronization utility 64. This is accomplished by translating LDAP database entries to Bind 8 DNS zone files. In an alternative embodiment, the DS may have only one source of data. In this alternative example, the DNS request would be translated to an LDAP request and forwarded to the LDAP service 66, while the DNS service 62 waited for a response. The billing module 68 (see FIG. 5) accesses the LDAP service 66 for a log of activity, e.g., number of each users requests for resolution over a given time period. The billing module 68 may then send each user a bill based on the amount of their access. In an alternative embodiment, a monthly registration fee may be charged to a user. Other aspects, advantages, and modifications are also within the scope of the following claims.

For example, a computer system provides a directory service over a public computer network, the system including a computer connected to the public computer network which performs the following functions:

a) receiving an electronic transmission with at least one telephone number and associated public network address from one or more users;

b) entering in a database that is accessible to users via the public computer network, the at least one telephone number and associated public network address; and c) maintaining the database for a predetermined time period during which users may submit requests for resolution of the telephone number to the associated public network address.

The computer may be a computer server, and the public computer network may be the Internet. A user may access entries from the database. The computer may include at least one interface for receiving electronic transmissions from multiple communication systems, including two or more of IP-PBX, IP-CO, IP-Centrex, IP-telephone, IP-wireless phone, IP-voicemail, IP-fax, unified messaging and remote printing systems. The computer may also include a web site which provides information on the database to users.

In another embodiment, a computer apparatus for a directory service resolves a telephone number to an associated Internet address. The apparatus includes a computer having a CPU and a memory operatively connected to the CPU. The apparatus also includes at least one interface process, adapted for communicating with the computer, for transmitting to the computer a request for resolution of a telephone number to an associated Internet address. The memory in the computer contains a program, adapted to be executed by the CPU, for resolving the request. The computer receives the request from the interface process and resolves the request.

In yet another embodiment, a method provides a directory service for resolving a telephone number to an Internet address, including the steps of:
  inputting to a computer via a communication system, a request for resolution of a
  telephone number to an associated Internet address;
  executing a program on the computer to resolve the request; and
  outputting the resolved Internet address from the computer to the communication system.

In yet another embodiment, a system provides a directory service and includes:
  establishing by a customer an account with a provider of the directory service (DS); registering telephone numbers and associated Internet addresses in the DS; accessing the DS for resolution of a registered telephone number to an associated Internet address; and
  billing customers for accessibility to the DS.

In yet another embodiment, a method comprises:
  registering a unique identifier and associated network address with a directory service (DS), the DS being accessible via a public data network; and
  accessing the DS via the public data network with a request for resolution of the unique identifier to the associated network address, wherein the DS resolves the associated network address.

In yet another embodiment, a system comprises:
  an external directory service (DS) accessible via a public data network;
  the DS comprising registered unique identifiers and associated data network addresses; and
  an interface for the DS allowing multiple communication systems to access the DS.

In yet another embodiment, a computer system provides a DS over a public data network and includes a computer connected to the public data network which performs the following functions:
  a) receiving an electronic message with at least one unique identifier and associated network address from one or more users;
  b) entering in a database that is accessible to users via the public data network, the electronic message, and
  c) maintaining the database for a predetermined time period during which users may submit requests for resolution of the unique identifier to the associated network address.

Other aspects, advantages, and modifications are also within the scope of the following claims.

What is claimed is:

1. A system comprising:
  a directory service (DS), residing on the Internet, containing non-Internet related unique identifiers and associated Internet addresses, wherein the unique identifiers are an identification of one or more selected from the group consisting of a station set, person, place and organization;
  at least one unique identifier being associated with multiple Internet addresses for different Internet-enabled communications systems;
  the DS including a method to determine, in response to a request for resolution containing one unique identifier, a resolution of the one unique identifier to one of the multiple Internet addresses based on information contained within the request to determine which one Internet address is associated with a given communications system.

2. A system comprising:
  a directory service (DS), residing on the Internet, containing non-Internet related unique identifiers and associated Internet addresses, wherein the unique identifiers are one or more selected from the group consisting of telephone numbers, random numbers, personal identity codes, social security numbers, recorded spoken names, voice prints, finger prints, and retina scans:
  at least one unique identifier being associated with multiple Internet addresses for different Internet-enabled communications systems;
  the DS including a method to determine, in response to a request for resolution containing one unique identifier, a resolution of the one unique identifier to one of the multiple Internet addresses based on information contained within the request to determine which one Internet address is associated with a given communications system.

3. The system of claim 2, wherein the unique identifiers are telephone numbers.

4. A system comprising:
  a directory service (DS), residing on the Internet, containing non-Internet related unique identifiers and associated Internet addresses;
  at least one unique identifier being associated with multiple Internet addresses for different Internet-enabled communications systems, wherein the communications systems are one or more selected from the group consisting of IP-PBX, IP-CO, IP-Centrex, IP-telephone, IP-wireless phone, IP-voicemail, IP-fax, unified messaging, and remote printing systems;
  the DS including a method to determine, in response to a request for resolution containing one unique identifier, a resolution of the one unique identifier to one of the multiple Internet addresses based on information contained within the request to determine which one Internet address is associated with a given communications system.

5. The system of claim 4, wherein the multiple Internet addresses are Internet Protocol (IP) addresses.

6. A system comprising:
  a directory service (DS), residing on the Internet, containing non-Internet related unique identifiers and associated Internet addresses;

at least one unique identifier being associated with multiple Internet addresses for different Internet-enabled communications systems, wherein the multiple Internet addresses are one or more selected from the group consisting of an SMTP address, and a VPIM address;

the DS including a method to determine, in response to a request for resolution containing one unique identifier, a resolution of the one unique identifier to one of the multiple Internet addresses based on information contained within the request to determine which one Internet address is associated with a given communications system.

7. A system comprising:

a directory service (DS), residing on the Internet, containing non-Internet related unique Identifiers and associated Internet addresses;

at least one unique identifier being associated with multiple Internet addresses for different Internet-enabled communications systems, wherein the multiple Internet addresses are associated with multiple destinations selected from the group consisting of a telephone, voice mailbox, fax machine, printer, and unified messaging mailbox;

the DS including a method to determine, in response to a request for resolution containing one unique identifier, a resolution of the one unique identifier to one of the multiple Internet addresses based on information contained within the request to determine which one Internet address is associated with a given communications system.

8. The system of claim 7, further including a method to register the unique identifiers and associated Internet addresses with the DS.

9. The system of claim 7, further including a method to register users with the DS.

10. The system of claim 7, further including a method to charge users for accessing the DS.

11. The system of claim 7, further including a method to send a response containing the resolved one Internet address.

12. The system of claim 7, including an interface to the DS for the different Internet-enabled communications systems.

13. The system of claim 12, wherein the computer system includes a computer server.

14. The system of claim 12, wherein the computer system includes a CPU and memory operatively connected to the CPU, the memory containing a program, to be executed by the CPU, for performing the method to determine the resolution.

15. The system of claim 7, further including a system for establishing a customer account to enable a customer to access the DS with a request for resolution.

16. The system of claim 7, wherein the DS resides on a computer system.

17. The method of claim 15, including a system for charging customers for accessing the DS.

18. A system comprising:

a directory service (DS), residing on the Internet, containing non-Internet related unique identifiers and associated Internet addresses, wherein the DS includes additional information about a destination identified by the associated Internet address, the additional information being one or more selected from the group consisting of:

voice encoding;
formatting;
communication protocol;
authentication of a source; and
authentication of a destination;

at least one unique identifier being associated with multiple Internet addresses for different Internet-enabled communications systems;

the DS including a method to determine, in response to a request for resolution containing one unique identifier, a resolution of the one unique identifier to one of the multiple Internet addresses based on information contained within the request to determine which one Internet address is associated with a given communications system.

19. A method enabling communications between end users, the end users having access to Internet-enabled communications systems, at least one destination end user having a non-Internet related unique identifier associated with multiple Internet addresses for different Internet-enabled communications systems and the method including the steps of:

providing a directory service (DS), residing on the Internet, containing the unique identifiers and associated Internet addresses; and one of the end users causing a communications application to send to the DS a request for resolution containing the one unique identifier for the destination end user;

the DS resolving the one unique identifier to one of the multiple Internet addresses based on Information contained within the request to determine which one internet address is associated with a given communications system;

wherein a communications application receiving the response sends a communication via the internet based on the resolved one Internet address; and wherein the communication is one or more selected from the group consisting of real-time voice, voicemail, unified messaging, fax and remote printing.

20. A method enabling communications between end users, the end users having access to Internet-enabled communications systems, at least one destination end user having a non-Internet related unique identifier associated with multiple Internet addresses for different Internet-enabled communications systems and the method including the steps of:

providing a directory service (DS), residing on the Internet, containing the unique identifiers and associated Internet addresses; and one of the end users causing a communications application to send to the DS a request for resolution containing the one unique identifier for the destination end user;

the DS resolving the one unique identifier to one of the multiple Internet addresses based on information contained within the request to determine which one Internet address is associated with a given communications system;

wherein the multiple Internet addresses are one or more selected from the group consisting of an IP address of an IP telephone, an IP address of an IP mobile phone, and IP address of an IP-PBX, a VPIM address of a voicemail system, an SMTP address of a unified messaging system, an SMTP address of an email system, an IP address of a fax machine, and an IP address of a printer.

21. The method of claim 20, wherein end users are charged for accessing the DS.

22. The method of claim 20, wherein the end users register their unique identifiers and associated Internet addresses with the DS.

23. The method of claim 20, wherein the DS provides a response containing the resolved one Internet address.

24. The method of claim 20, wherein a communications application receiving the response sends a communication via the Internet based on the resolved one Internet address.

25. The method of claim 20, wherein the Internet-enabled communications systems contact the DS using different communications protocols.

26. The method of claim 25, wherein the different communications protocols are one or more selected from the group consisting of Lightweight Directory Access Protocol (LDAP), Domain Name System (DNS) and Hypertext Transport Protocol (HTTP).

27. The method of claim 20, wherein the end users contact the DS via a web browser.

28. The method of claim 20, wherein the different Internet-enabled communications systems reside on customer premises.

29. A method enabling communications between end users, the end users having access to Internet-enabled communications systems, at least one destination end user having a non-Internet related unique identifier associated with multiple Internet addresses for different Internet-enabled communications systems and the method including the steps of:

providing a directory service (DS), residing on the Internet containing the unique identifiers and associated Internet addresses; and one of the end users causing a communications application to send to the DS a request for resolution containing the one unique identifier for the destination end user;

the DS resolving the one unique identifier to one of the multiple Internet addresses based on information contained within the request to determine which one Internet address is associated with a given communications system; and wherein end users are selectively charged for one or more of registering with the DS and usage of the DS.

30. A method enabling communications between end users, the end users having access to Internet-enabled communications systems, at least one destination end user having a non-Internet related unique identifier associated with multiple Internet addresses for different Internet-enabled communications systems and the method including the steps of:

providing a directory service (DS), residing on the Internet, containing the unique identifiers and associated Internet addresses; and one of the end users causing a communications application to send to the DS a request for resolution containing the one unique identifier for the destination end user;

the DS resolving the one unique identifier to one of the multiple Internet addresses based on information contained within the request to determine which one Internet address is associated with a given communications system; and providing an interface enabling the different Internet-enabled communications systems to access the DS by one or more protocols selected form the group consisting of Hypertext Transport Protocol (HTTP), Lightweight Directory Access Protocol (LDAP), and Domain Name System (DNS).

31. A computer system for providing a directory service over a public computer network, comprising:

a computer connected to the public computer network which performs the following functions:
 (a) receiving an electronic transmission with at least one telephone number and associated public network address from one or more users;
 (b) entering in a database that is accessible to users via the public computer network, the at least one telephone number and associated public network address; and
 (c) maintaining the database for a predetermined time period during which users may submit requests for resolution of the telephone number to the associated public network address, wherein a user may access entries from the database; and wherein the computer includes at least one interface for receiving electronic transmissions from multiple communications systems selected from the group consisting of IP-PBX, IP-CO, IP-Centrex, IP-telephone, IP-wireless phone, IP-voicemail, IP-fax, unified messaging, and remote printing systems.

32. The computer system of claim 31, wherein the computer is a computer server.

33. The computer system of claim 31, wherein the public computer network is the Internet.

* * * * *

UNITED STATES PATENT AND TRADEMARK OFFICE
CERTIFICATE OF CORRECTION

PATENT NO.     : 6,539,077 B1
DATED          : March 25, 2003
INVENTOR(S)    : Ranalli et al.

It is certified that error appears in the above-identified patent and that said Letters Patent is hereby corrected as shown below:

Column 18,
Line 31, "scans:" should read -- scans; --

Column 19,
Line 16, "Identifiers" should read -- identifiers --

Column 20,
Line 31, "Information" should read -- information --
Line 33, "inter-" should read -- Inter- --.

Signed and Sealed this

Thirtieth Day of September, 2003

JAMES E. ROGAN
*Director of the United States Patent and Trademark Office*